United States Patent [19]

Ikari et al.

[11] Patent Number: 4,466,723
[45] Date of Patent: Aug. 21, 1984

[54] ELECTROMAGNETIC DRIVE DEVICE

[75] Inventors: Hideo Ikari; Michio Hirohata, both of Tokyo, Japan

[73] Assignee: Canon Kabushiki Kaisha, Tokyo, Japan

[21] Appl. No.: 418,381

[22] Filed: Sep. 15, 1982

[30] Foreign Application Priority Data

Sep. 24, 1981 [JP] Japan ................. 56-151267

[51] Int. Cl.³ .............................................. G03B 3/10
[52] U.S. Cl. ................................. 354/400; 354/234.1
[58] Field of Search ................... 354/400, 234.1, 235.1

[56] References Cited

U.S. PATENT DOCUMENTS

| | | | |
|---|---|---|---|
| 3,762,299 | 10/1973 | Douglas | 354/235.1 |
| 4,209,242 | 6/1980 | Kitai et al. | 354/400 |
| 4,258,988 | 3/1981 | Kitai et al. | 354/400 |
| 4,348,094 | 9/1982 | Hirohata et al. | 354/234.1 |
| 4,396,267 | 8/1983 | Hirohata et al. | 354/234.1 |

Primary Examiner—A. A. Mathews
Attorney, Agent, or Firm—Toren, McGeady and Stanger

[57] ABSTRACT

In the disclosed camera drive device, a driver electromagnetically driven by coils opens and closes shutter blade members and other exposure members. A holding arrangement holds the blade members closed while the driver controls the other exposure members and a control arrangement actuates the holding arrangement independently of the operating condition of the driver.

9 Claims, 7 Drawing Figures

ELECTROMAGNETIC DRIVE DEVICE

BACKGROUND OF THE INVENTION

1. Field of the Invention

This invention relates to an improvement on an electromagnetic drive device which operates a shutter blade or the like of a photographic camera with driving force obtained from a driving electric current flow to a coil provided on a rotor arranged within a magnetic field.

2. Description of the Prior Art

Many camera shutters have been contrived of late to be operated by electromagnetic drive devices which better permit structural simplification than the conventional mechanical shutters. In the cameras of this type having the electromagnetic drive device, arrangement to have the electromagnetic drive device also control the action of a mechanism participating in an exposure, such as an automatic focusing device or the like, in addition to the shutter driving action thereof dispenses with a magnet or the like which is conventionally used for locking such an exposure participating mechanism. This arrangement, therefore, is advantageous in terms of space and cost for cameras which are required to be as compact as possible. However, there has been a shortcoming in the prior art arrangement of the above stated type. The shortcoming resides in that, with the electromagnetic drive device arranged to perform combined functions of controlling an automatic focusing device and controlling the operation of shutter blade members or the like, the shutter blade members might be operated to accidentally effect an exposure when the automatic focusing device is controlled by the electromagnetic drive device.

To solve the above stated problem, the present inventor has previously proposed a method as disclosed in a U.S. patent application Ser. No. 381,785, filed by the same applicant as the present application. This prior art method is as described below with reference to FIG. 7 of the accompanying drawings:

When a shutter release button of a camera is depressed, a distance measuring mechanism which is not shown operates to detect a distance to an object to be photographed. After that, a control circuit which is not shown causes an electric current flow to a coil 101. Then, there is produced an electromagnetic driving force, which causes a rotor 102 to rotate clockwise while charging a spring 103. A driving pin 102b pushes an acting part 111d of a clamping lever 111. Meanwhile, this rotation also disengages a pushing part 104b of a sector ring 104 from a protrudent part 102a of the rotor 102. At this time, however, the sector ring 104 is prevented from rotating by an arm part 104c thereof as the arm part engages a notch 128a provided in a sector ring lever 128. Therefore, shutter blades 107 remain stationary.

With the acting part 111d of the clamping lever 111 pushed by the driving pin 102b, the clamping lever 111 rotates counterclockwise to disengage a pawl part 114a of an automatic focusing (hereinafter will be called AF) start lever 114 from a first clamping part 111a of the lever 111 and to position a protrudent part 111c thereof within an operating region of a transmitting lever 117. Then, a start pawl 119 is caused by the urging force of a spring 115 to rotate counterclockwise together with the AF start lever 114. With the pawl 119 thus rotated, the claw part 119a thereof disengages from a protrudent part 122a of a set plate 122 to allow the set plate 122 to be moved by the urging force of a spring 120 downward as viewed on the drawing. This downward motion of the set plate 122 causes a photo-taking lens 125 to move inward along a cam 122d of the set plate 122. Meanwhile, the motion of the set plate 122 also causes an arm part 122c of the set plate 122 to let go its hold of the transmission lever 117. Accordingly, the urging force of the spring 115 is transmitted through the transmission lever 117 to cause an AF stop lever 126 to rotate clockwise. However, the rotation of the lever 126 comes to a stop at a position where it comes to engage the protrudent part 111c of the clamping lever 111. After that, when the photo-taking lens 125 is moved by the movement of the set plate 122 to a position corresponding to the distance to the object to be photographed, the power supply to the coil 101 from the control circuit is cut off. Therefore, when the photo-taking lens 125 reaches the infocus position, the spring 103 causes the rotor 102 to rotate counterclockwise. The counterclockwise rotation of the rotor 102 causes the clamping lever 111 to rotate clockwise and the protrudent part 111c of the clamping lever 111 disengages from the transmission lever 117. Therefore, the urging force of the spring 115 causes the transmission lever 117 and the AF stop lever 126 to rotate until the pawl part 126a of the AF stop lever 126 engages a toothed part 122e of the set plate 122 to bring the movement of the set plate 122 to a stop. Meanwhile, the transmission lever 117 pushes an end part 128c of the sector ring lever 128 to cause the lever 128 to rotate against the urging force of a spring 130. The rotation of the sector ring lever 128 causes an adjustment lever 131 to rotate clockwise on a fulcrum 132. This rotation of the adjustment lever 131 increases the urging force of the spring 103 while the arm part 104c of the sector ring 104 is disengaged from the notch part 128a of the sector ring lever 128. With this, an automatic focusing action (hereinafter will be called an AF action for short) comes to an end.

Upon completion of the AF action, the control circuit again causes a power supply to the coil 101 to cause the rotor 102 to rotate clockwise. At this time, however, since the pawl part 114a of the AF start lever 114 is in engagement with a second clamping part 111b of the clamping lever 111, the acting part 111d of the clamping lever 111 has been withdrawn from the separating region of the driving pin 102b. Therefore, the rotation of the rotor 102 is never affected by the clamping lever 111. Meanwhile, since the sector ring 104 is not in engagement with the sector ring lever 128 at this time, the urging force of the spring 105 causes the sector ring 104 to follow the clockwise rotation of the rotor 102. Accordingly, the shutter blade 107 rotates on a fulcrum 108 to begin an exposure. Then, an exposure control mechanism which is not shown begins to count the quantity of incident light. When a predetermined quantity of the incident light has been detected by the exposure control mechanism, the control circuit cuts off the power supply to the coil 101. Since the urging force of the spring 103 is arranged to be sufficiently larger than that of the spring 105, the pushing part 104b of the sector ring 104 receives a strong returning force in the counterclockwise direction from the protrudent part 102a of the rotor 102. Therefore, when the power supply to the coil 101 is cut off, the moving direction of the sector ring 104 is swiftly reversed to close the shutter blade 107. Such arrangement permits control over a high speed shutter time.

Upon completion of the above described photographing operation, a charging mechanism which is not shown moves the set plate 122 upward as viewed on the drawing to charge each mechanism of the camera and thus to bring the whole camera back to the state as shown in FIG. 7.

However, in accordance with the above described prior art arrangement, while the automatic focusing action is controlled by the driving action of the electromagnetic drive device, the shutter blade must be kept in a closed state against a spring force to prevent it from being opened by the driving force during the automatic focusing action. Then, in a camera which is not allowed to have a large power source for the sake of compactness, the driving force of the electromagnetic drive device becomes so weak that it is hardly possible to keep the shutter blade closed against the spring force over a long period of time.

Further, the prior art arrangement described above has operating members arranged out of harmony resulting in insufficient precision of their interlocking relation and also has presented a problem with regard to reduction in size.

SUMMARY OF THE INVENTION

It is a first object of the invention to provide an improvement on an electromagnetic device for a camera wherein, when the electromagnetic device which is arranged to drive exposure effecting blade members performs a control action on a mechanism participating in an exposure such as automatic focusing device or the like, a mechanical arrangement interlocked with the exposure participating mechanism inhibits the blade members from being accidentally operated by the control action, independently of the control action of the electromagnetic drive device, so that a reliable operation of the camera can be ensured even when the driving force of the electromagnetic drive device is weak.

It is a second object of the invention to provide an electromagnetic drive device in which one member performs manifold functions to permit reduction in size and improvement in precision of interlocking arrangement between members.

These and further objects and features of the invention will become apparent from the following detailed description of a preferred embodiment thereof taken in conjunction with the accompanying drawings.

DETAILED DESCRIPTION OF THE PREFERRED EMBODIMENT

Figure 1:
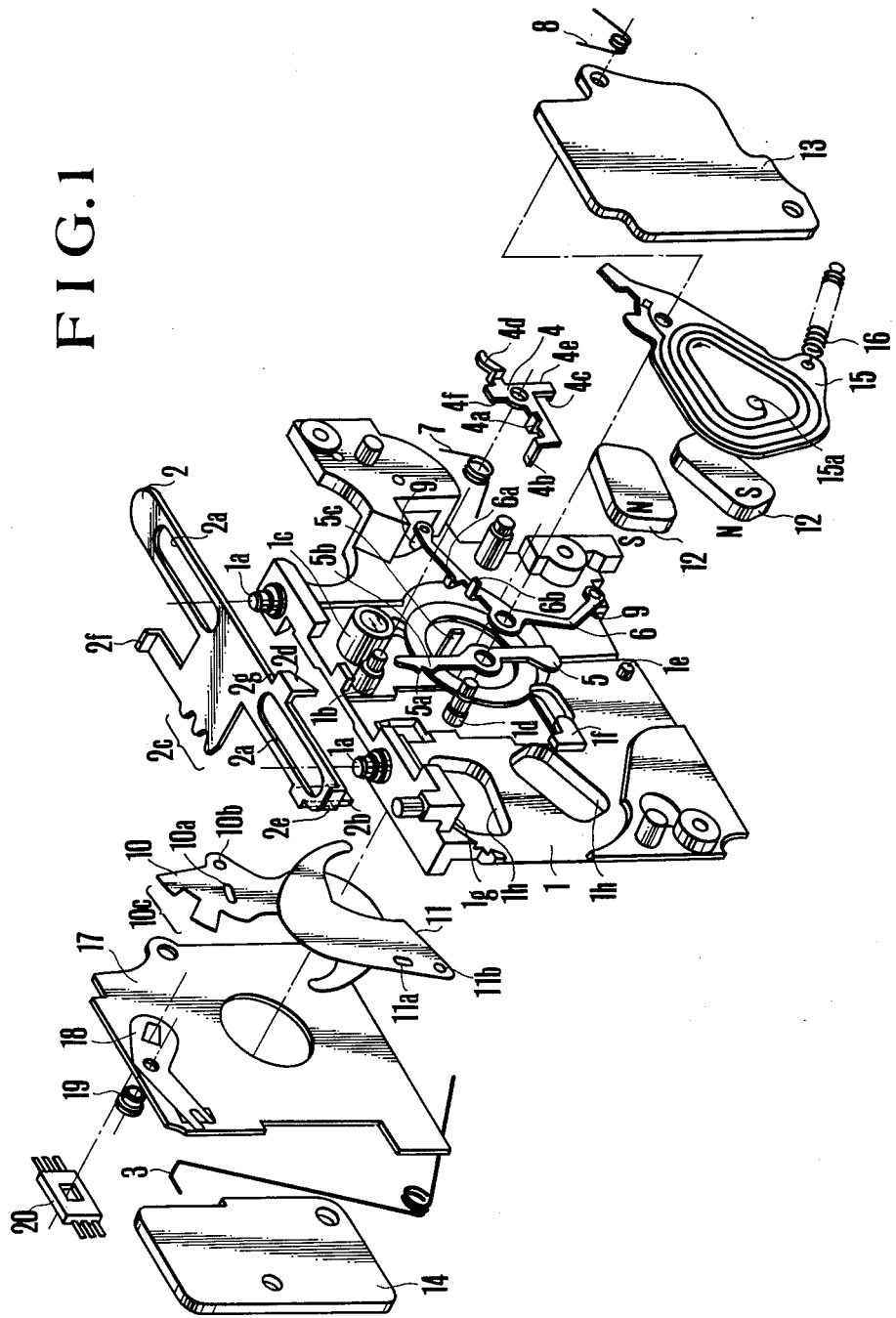
FIG. 1 is an exploded view showing an electromagnetic drive device as an embodiment of the invention.

Referring to FIG. 1 which shows, in an exploded view, an electromagnetically operated shutter as a preferred embodiment of the present invention, the shutter includes a shutter base plate 1. A set plate 2 is provided with slots 2a which are arranged to engage first dowels 1a of the base plate 1 and to be slidable right and left. The set plate 2 is provided also with a spring peg 2b which engages a spring 3 to have the plate 2 thus urged leftwards by the spring 3. A rack part 2c of the plate 2 engages a gear of a film winding system which is not shown. The gear makes one turn in feeding each frame of the film. This turning motion of the gear is transmitted to the set plate 2 to charge it rightwards against the force of the spring 3. A locking claw 2d of the set plate 2 engages the first claw part 4a of a locking lever 4, which will be described later, to keep the set plate 2 in a first position in which the plate 2 is in a state of being charged rightwards. When the locking lever 4 rotates counterclockwise, the locking claw 2d is disengaged from the first claw part 4a of the lever 4 and the force of the spring 3 causes the set plate 2 to move to the left until it comes to a second position in which the right end of the slot 2a comes into pressure contact with the first dowel 1a. When the set plate 2 moves from the second position to the first position, a charging claw 2e of the plate 2 charges a charge plate 21 (see FIG. 6) of an automatic focusing (AF) device disposed on the set plate 2. The set plate 2 is further provided with a winding lock releasing claw 2f which is arranged to disengage a member related a winding lock (not shown) when the set plate 2 moves from the first position to the second position. The locking lever 4 is pivotally carried by a second stud 1b of the shutter base plate and is provided with a second claw part 4b. This claw part 4b is arranged to engage a first claw part 5a or a second claw part 5b of a release lever 5 which will be described later. The locking lever 4 is further provided with an opening stop claw 4c. When the second claw part 4b is in the position of engaging either the first claw part 5a or the second claw part 5b of the release lever 5, this opening stop claw 4c engages a first claw part 6a of a sector lever 6, which will be described later, to prevent the clockwise rotation of the sector lever 6. When the claw 4b rotates counterclockwise further from the position of engaging the second claw part 5b of the release lever 5, the opening stop claw 4c disengages from the first claw part 6a to enable the sector lever 6 to rotate clockwise. The locking lever 4 has a rotation stopper 4d. When the locking lever 4 rotates counterclockwise, this rotation stopper 4d stops the rotation of the locking lever 4 to prevent the second claw part 4b of the lever 4 from rotating counterclockwise further from its position of engaging the second claw part 5b of the release lever 5 by staying in pressure contact with a locking lever receiving face 21a of the charge plate 21 (shown in FIG. 6) until the second claw part 4b of the lever 4 comes back to a position where it can engage the second claw part 5b of the release lever 5 after disengagement from the set plate 2.

A spring 7 is arranged about the second stud 1b of the shutter base plate 1 and is arranged between a light guide tube 1c and the second claw part 4b of the locking lever 4 to urge the locking lever 4 counterclockwise. The counterclockwise rotation of the locking lever 4 comes to a stop at a point where a first edge 4e of the locking lever 4 comes into pressure contact with the light guide tube 1c. When the set plate 2 moves from the second position to the first, an edge 2g of the set plate 2 pushes a second edge 4f of the locking lever 4 to cause the lever 4 to rotate clockwise against the force of the spring 7. Then, when the lever 4 thus comes further than a point where the second claw part 4b thereof engages the first claw part 5a of the release lever 5, the set plate 2 moves a little backward to have the locking claw 2d thereof engage the first claw part 4a of the locking lever 4 to set the lever 4 in the first position. The set plate 2 is so arranged that, at that time, the locking claw 2d thereof does not come into contact with the first claw part 4a of the locking lever 4. The release lever 5 is pivotally carried by a first stud 1d of the shutter base plate 1. A spring 8 which is arranged about the stud 1d and between a third claw part 5c of the release lever 5 and the second claw part 6b of the sector sleeve 6 urges the release lever 5 counterclockwise. The sector lever 6 is also pivotally carried by the first stud 1d of the shutter base plate 1. Blade driving pins 9 are attached to the two ends of the sector lever 6 and are arranged to engage the driving holes 10a and 11a of blades 10 and 11. The rotation of the sector lever 6 is transmitted through these pins 9 to the blades to open them when the lever 6 rotates clockwise and to close them when the lever 6 rotates counterclockwise. The release lever 5, the sector lever 6 and the blade driving pins 9 are made of a non-magnetic material to preclude the possibility of having them attracted or magnetized by a magnet 12, so that their movements will never be affected by such. The blades 10 and 11 are pivotally carried through their holes 10b and 11b by rotating shafts which are erected on a shutter base plate but are not shown as they are located on the rear sides of the blades. These blades 10 and 11 are thus arranged to be rotatable on the shafts. The blade 10 is provided with a photometric light quantity adjustment part 10c for adjusting the quantity of light received by a photometric light sensitive element for the purpose of exposure adjustment. The embodiment further includes two parmanent magnets 12 which are magnetized in the direction of thickness. Each of these permanents magnets 12 is fitted in a perforated path 1h of the shutter base plate 1. The upper magnet has a north pole on the side of a front yoke 13 while the lower magnet has a south pole on the side of the front yoke 13 with their magnetic poles thus oppositely arrangement. Reference numerals 13 and 14 respectively denote the front yoke and a rear yoke. The rear yoke 14 has the magnet attracted thereto by a magnetic force while the magnet is located away from the front yoke 13 at a predetermined distance to form a magnetic circuit. A rotator 15 is pivotally carried by the first stud 1d of the shutter base plate 1 and is urged counterclockwise by the force of a spring 16 which is arranged between a spring peg 1e of the base plate 1 and the rotor 15. The rotor 15 is provided with printed coils which are formed on both sides of the rotor 15. The coils on both sides of the rotor are arranged to be continuous to each other by suitable means such as through hole plating provided at a continuity part 15a, so that a current can be allowed to flow in the same direction through the coils on both sides as viewed from the front of the rotor 15. The rotor 15 is rotatable through a space provided between the above stated magnet 12 and the front yoke 13. With an electric current allowed to flow through the coils in the counterclockwise direction, an electromagnetic force which causes the rotor 15 to rotate clockwise is developed in accordance with the left-hand rule of Fleming.

A space through which the blades are allowed to move is limited by means of a blade retainer 17. An auxiliary stop 18 is rotatably mounted on the blade retainer 17 by means of a screw 19 and is arranged to permit adjustment of the light receiving timing of a light sensitive element 20 provided for exposure control. The exposure controlling light sensitive element 20 forms a part of a circuit which is arranged to control power supply to the rotor 15.

A peripheral portion of a stepped part 1f of the shutter base plate 1 serves as stopper for the sector lever while another portion thereof serves as a pressure contact face for the rotor at its start position. A wall face 1g of the shutter base plate 1 serves as a pressure contact face for the rotor at its stop position.

Figure 2:
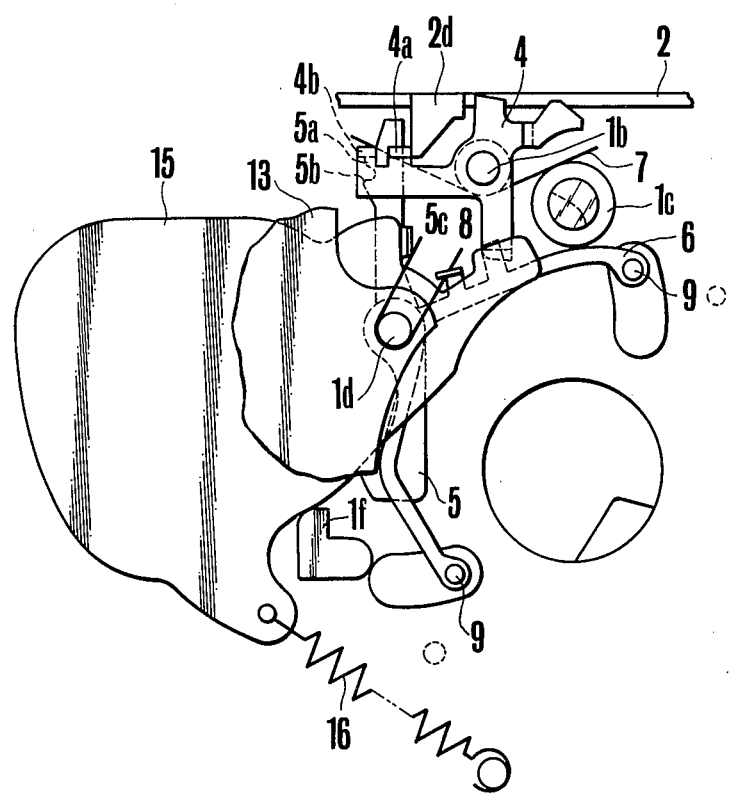
FIGS. 2, 3 and 4 are plan views showing essential parts of the electromagnetic drive device of FIG. 1 as in various actions.
Figure 3:
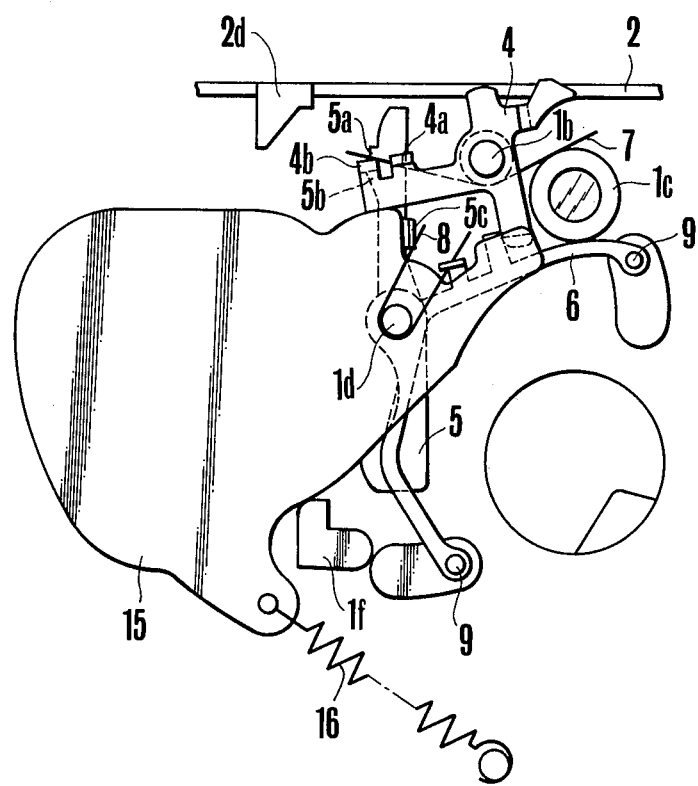
Figure 4:
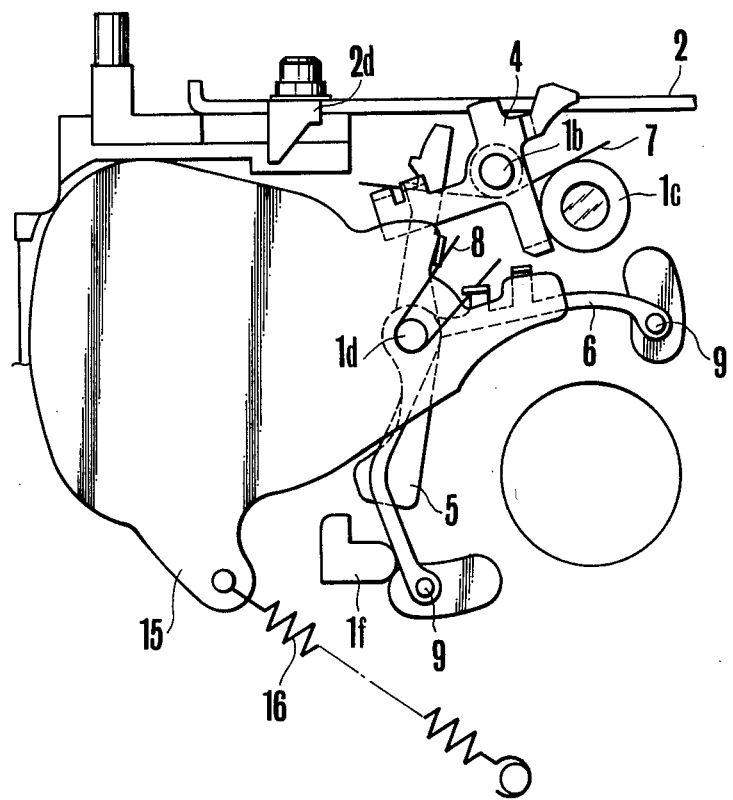
Figure 5:
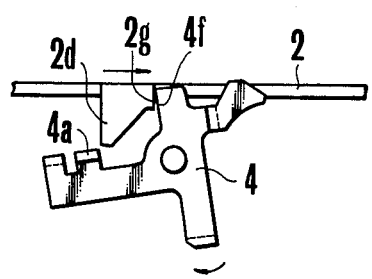
FIGS. 5 and 6 are plan views showing a locking lever of the device of FIG. 1 as in various actions.
Figure 6:
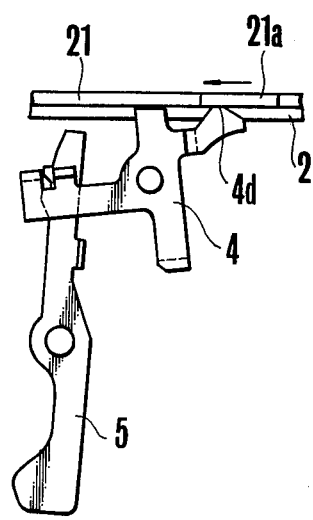
Figure 7:
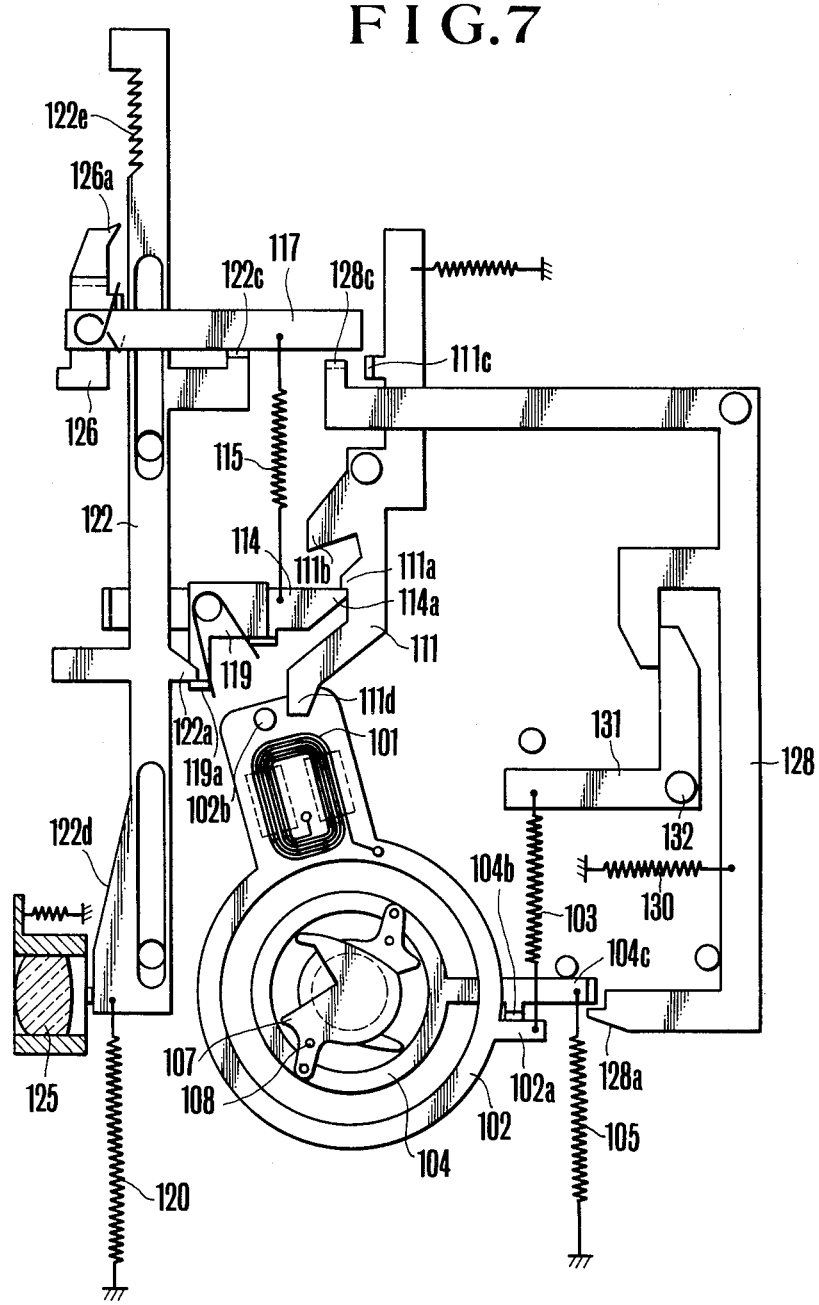
FIG. 7 is a plan view showing the arrangement of a prior art device.

The electromagnetically operated shutter shown in FIG. 1 as an embodiment of the invention operates as follows:

FIGS. 2, 3 and 4 are plan views showing the essential parts of the shutter as in their various actions while FIGS. 5 and 6 are plan views showing the actions of the locking lever of the shutter.

In the condition after completion of film winding as shown in FIG. 2, the set plate 2 is in the first position and the locking claw 2d thereof is in engagement with the first claw part 4a of the locking lever 4. The second claw part 4b of the locking lever 4 is engaged with the first claw part 5a of the release lever 5. The rotor 15 is in pressure contact with the stepped part 1f of the shutter base plate 1. The sector lever 6 is in repose at a point where the lower portion of the first claw part 6a of the sector lever 6 is in pressure contact with the rotor 15. Under the condition as shown in FIG. 2, when the shutter control circuit which is not shown is operated with the shutter release button operated, a first power supply is effected to the printed coils of the rotor 15. Then, an electric current flows on both sides of the rotor in the counterclockwise direction as viewed from the front, or in the rightward direction as viewed on FIG. 1. With the current flowing in this manner, the lines of magnetic force of the above stated magnetic circuit are directed from the rear to the front in the upper part of the circuit and from the front to the rear in the lower part of the magnetic circuit. Then, the current flows through the printed coils of the rotor 15 from the right to the left and from the left to the right respectively. Both the printed coils then produce forces to cause the rotor 15 to rotate clockwise according to the left-hand rule of Fleming. The rotor 15, therefore, rotates clockwise against the forces of the spring 16. Since the rotor 15 is located at some distance from the third claw part 5c of the release lever 15, the rotor comes into pressure contact with the third claw part 5c of the release lever with some impact thereon after the rotor has rotated to a small extent. This causes the release lever 5 to rotate clockwise against the force of the spring 8. With the lever 5 rotated in this manner, the first claw part 5a of the release lever 5 disengages from the second claw part 4b of the locking lever 4. This disengagement allows the locking lever 4 to be rotated counterclockwise by the force of the spring 7. The locking lever 4 comes to a stop when the rotation stopper 4d of the lever 4 comes into pressure contact with the receiving fact 21a of the charge plate 21 shown in FIG. 6. This rotation causes the first claw plate 4a of the locking lever 4 to disengage from the locking claw 2d of the set plate 2 to allow the set plate 2 to be swiftly moved to the left by the force of the spring 3. Further, the rotor 15 is arranged such that the set plate 2 which has a relative large engaging force is stably released from a clamped state with a relatively small driving force through the locking lever 4 arranged between the release lever 5 and the set plate 2. The charge plate 21 which is disposed on the set plate 2 is engaged with a governor (not shown) and is thus arranged to be moved to the left by the force of a spring (not shown) at a speed lower than the speed of the set plate. The charge plate 21 comes to a stop at a point corresponding to the distance measurement position of the automatic focusing device (the AF device) after the receiving face 21a of the charge plate 21 is disengaged from the rotation stopper 4d of the locking lever 4. The above stated first power supply to the coils is cut off while the receiving face 21a of the charge plate 21 is in pressure contact with the rotation stopper 4d of the locking lever 4. Then, the rotor 15 is caused to rotate counterclockwise by the force of the spring 16. The release lever 5 is caused by the force of the spring 8 to rotate counterclockwise until it comes to a stop at a point where the second claw part 4b of the locking lever 4 comes into pressure contact with the release lever 5 between the first and second claw parts 5a and 5b thereof. When the receiving face 21a of the charge plate 21 is released from the pressure contact with the rotation stopper 4d of the locking lever 4, the locking lever 4 further rotates counterclockwise. Then, the lever 4 comes to a stop when the second claw part 4b thereof comes to engage the second claw part 5b of the release lever 5. During this process, the sector lever 6 is urged clockwise by the force of the spring 8. However, the first claw part 6a of the lever 6 is in pressure contact with the opening stopping claw 4c of the locking lever 4 to prevent a shutter aperture from being opened. After these processes, the shutter or the embodiment changes from the condition of FIG. 2 to another condition as shown in FIG. 3. After the photo-taking lens has been brought to a stop at a position corresponding to a measured distance after completion of the distance measurement by the AF device, a second power supply is effected to the coils of the rotor 15. The power supply causes the rotor 15 to rotate clockwise in the same manner as at the time of the first power supply. The rotor 15 pushes the third claw part 5c of the release lever 5 to cause the lever 5 to rotate clockwise. The rotation of the release lever 5 disengages the second claw part 5b thereof from the second claw part 4b of the locking lever 4. This allows the locking lever 4 to rotate counterclockwise until it comes to a stop with the first edge portion 4e thereof coming into pressure contact with the light guide tube 1c. This rotation of the locking lever 4 further disengages the opening stop claw 4c thereof from the first claw part 6a of the sector sleeve 6. The disengagement allows the force of the spring 8 to rotate the sector lever 6 clockwise. Then, the blade driving pins 9 erected on the lever 6 causes the blades 10 and 11 to rotate to open the shutter diaphragm. Following this, the embodiment changes from the condition of FIG. 3 to a condition as shown in FIG. 4. With a photometric circuit operated prior to the operation of the shutter diaphragm blades 10 and 11, when the quantity of the light received at the light sensitive element 20 reaches a predetermined value, the second power supply to the coils of the rotor 15 is cut off. This allows the force of the spring 16 to rotate the rotor 15 counterclockwise to impulsively bring it into pressure contact with the first claw part 6a of the sector lever 6. This causes the sector lever 6 to rotate counterclockwise together with the rotor 15. The rotor 15 comes to a stop when it comes into pressure contact with the stepped part 1f of the shutter base plate 1. The rotation of the sector lever 6 causes the shutter blades 10 and 11 to close. After completion of a photo-taking operation resulting from the second power supply to the coils of the rotor 15, the gear of the film winding system rotates. Then, the rack 2c exerts a force on the set plate 2 to move it to the right. The locking claw 2d of the set plate 2 pushes the second edge portion 4f of the locking lever 4 to cause the lever 4 to rotate clockwise while the claw of the set plate 2 is moving to the right. At this time, as shown in FIG. 5, the locking claw 2d moves without contacting the first claw part 4a of the locking lever 4. The clockwise rotation of the locking lever 4 brings the second claw part 4b of the lever 4 to a point farther to the right than a position where the second claw part 4b engages the first claw part 5a of the release lever 5, which is urged counter-clockwise by the force of the spring 8. After that, the locking claw 2d moves backward to the left and comes to a stop by engaging the first claw part 4a of the locking lever 4.

As will be apparent from the foregoing description, the same operation can be accomplished by reversing the magnetic pole arrangement of each of the permanent magnets 12 and by reversing the direction of the power supply to the coils of the rotor 15.

The foregoing description of the embodiment indicates that the features of the present invention can be summarized as follows:

(1) Between the locking lever and the release lever, the locking lever is arranged to have the first and second engaging positions. The locking lever is disengaged from the set plate when it is between the first and second engaging positions. However, after the disengagement from the set plate, the means provided according to the invention brings the locking lever to a temporary stop to have it wait for the return of the release lever. This arrangement ensures the second engagement between the locking lever and the release lever. Besides, the arrangement facilitate control by allowing a sufficient time for the first power supply to the coils of the rotor.

(2) The locking lever is arranged to be capable of engaging not only with the release lever and the set plate but also with the sector lever. During the first power supply to the coils of the rotor, the shutter is prevented from opening. Further, since the locking lever is arranged not to come into contact with the set plate at the time of charging, this arrangement dispenses with a one-way clutch mechanism which is employed in the conventional charging mechanism. The invention, therefore, permits reduction in the number of parts required, size and cost with improved precision.

(3) The interlocking relation among many members is concentratedly controlled through the arrangement of the locking lever to ensure improvement in the precision of the whole interlocking relation.

As described in the foregoing, the electromagnetic drive device according to the invention includes mechanical means interlocked with the mechanism participating in an exposure effecting operation. When the drive device controls the exposure participating mechanism, this mechanical means inhibits a driving action on the shutter blade members independently of the control action of the drive device on the exposure participating mechanism, so that the camera can be reliably operated even where the driving time of the electromagnetic drive device is short.

Further, with the electromagnetic drive device according to the invention arranged to have a single member perform manifold functions, the structural arrangement can be simplified in a compact size. Since the number of engaging relations between members can be lessened in accordance with the invention, the invention enhances the precision of arrangement between members and that of the whole system.

According to the present invention, as described hereinbefore, the electromagnetic drive device which drives the exposure effecting blade member is designed so as to prohibit the driving of the blade member, irrespective of the control operation for the exposure participating mechanisms of the drive device, by the mechanical means interlocked with the exposure participating mechanisms when the exposure participating mechanisms are controlled so that even if the driving force of the electromagnetic drive device is very weak the sure operation can be performed and a long time current supply to the drive device can be eliminated, thus greatly saving the energy.

In the electromagnetic driving mechanism according to the present invention, one component member is assigned with many functions so as to reduce the number of the parts, thus simplifying and compacting the structure. Also a less number of interrelating means among individual members is required so that the accuracy of the device as a whole is greatly improved.

What we claim:

1. An electromagnetic drive device for a camera, comprising:
   a plurality of coils disposed within a magnetic field and arranged to produce an electromagnetic driving force when a power supply is effected thereto;
   a driving member including said coils and being arranged to be operated by said electromagnetic driving force;
   a plurality of blade members which perform opening and closing actions for effecting an exposure in response to the operation of said driving member;
   an exposure participating mechanism other than said blade members, said mechanism being controlled by an action of said driving member similar to the action thereof performed for opening and closing the blade members;
   holding means for holding the blade members in a closed state while said driving member is performing the control action on said exposure participating mechanism; and
   control means for actuating said holding means, said control means being arranged to operate independently of the operating state of said driving member.

2. An electromagnetic drive device according to claim 1, wherein said exposure participating mechanism is arranged to operate prior to the opening and closing actions of said blade members.

3. An electromagnetic drive device according to claim 2, wherein said exposure participating mechanism is provided for performing an automatic focusing operation.

4. An electromagnetic drive device according to claim 3, wherein said holding means release said blade members from their closed state when said driving member has come back to its initial position after completion of its control action on said exposure participating mechanism.

5. An electromagnetic drive device according to claim 4, wherein said control means is arranged to operate in association with said exposure participating mechanism.

6. An electromagnetic drive device according to claim 5, wherein said holding means is mechanically interlocked with said exposure participating mechanism.

7. An electromagnetic drive device for a camera, comprising:
   a plurality of coils disposed within a magnetic field and arranged to produce an electromagnetic driving force when a power supply is effected thereto;
   a driving member including said coils and being arranged to be caused to execute a single motion by said electromagnetic driving force;
   an exposure participating mechanism arranged to operate prior to an exposure;
   a plurality of blade members arranged to perform opening and closing actions for effecting an exposure;
   inhibiting means for inhibiting said exposure participating mechanism and said blade members from operating, said inhibiting means being arranged to relinquish said inhibition in response to the motion of said driving member; and
   blocking means arranged to prevent said inhibiting means from relinquishing the operation inhibiting action thereof on said blade members independently of the motion of said driving member when said inhibiting means relinquishes its operation inhibiting action on the exposure participating mechanism, said blocking means being arranged to operate in association with said exposure participating mechanism.

8. An electromagnetic drive device according to claim 7, wherein said exposure participating mechanism is provided for performing an automatic focusing operation.

9. An electromagnetic drive device according to claim 8, wherein said inhibiting means consists of a movable discrete member and an urging member which is arranged to urge said discrete member in one direction.

* * * * *